No. 806,661. PATENTED DEC. 5, 1905.
W. J. HAMILTON.
COATING REFRIGERATING PIPES.
APPLICATION FILED APR. 30, 1904.

WITNESSES:
René Bruine
Theodore T. Snell

INVENTOR:
William J. Hamilton
By Attorneys,
Arthur E. Fraser & Co.

UNITED STATES PATENT OFFICE.

WILLIAM J. HAMILTON, OF FRANKLIN, PENNSYLVANIA.

COATING REFRIGERATING-PIPES.

No. 806,661.  Specification of Letters Patent.  Patented Dec. 5, 1905.

Application filed April 30, 1904. Serial No. 205,833.

*To all whom it may concern:*

Be it known that I, WILLIAM J. HAMILTON, a citizen of the United States, residing in Franklin, in the county of Venango and State of Pennsylvania, have invented certain new and useful Improvements in Coating Refrigerating-Pipes, of which the following is a specification.

It is well known that in refrigerating machinery and in the pipes used in cold-air storage-houses and in similar mechanism the tendency to accumulate a coating of frost or ice on the pipes interferes greatly with their usefulness. The same thing is true of other parts of the mechanism than the pipes. These conditions give rise to very serious inconvenience in liquid-air machines and other apparatus in which air passes through the interior of pipes which are at a freezing temperature. My invention aims to provide a very simple and cheap means and process for eliminating these disadvantages in the several types of apparatus mentioned and, in fact, wherever metal pipes or the like are subjected to similar conditions. It has been proposed to avoid the formation or accumulation of frost upon such pipes by the continuous passage of a non-freezing brine over the exposed surface of the pipes. It has been proposed also to apply glycerin in the same manner or as a coating or film around the pipes. The objection to the application of glycerin as a film is that it absorbs vapor from the air, and thus in a little while forms the ice which it is the desire of this invention to avoid.

According to this invention it is proposed to maintain on the exposed surface of the pipe a water-repelling covering, preferably by coating such exposed face with material which shall be solid at the temperature encountered in use. An example of a suitable material is paraffin, which is very cheap and whose water-repelling qualities are well known.

The accompanying drawings illustrate in cross-section two pipes embodying the improvement.

Figure 1:
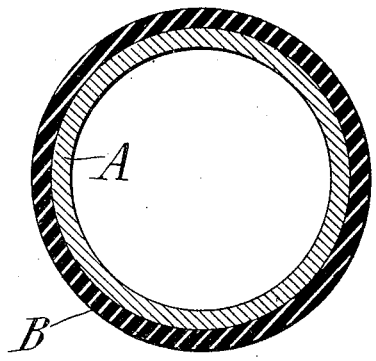
Figure 2:
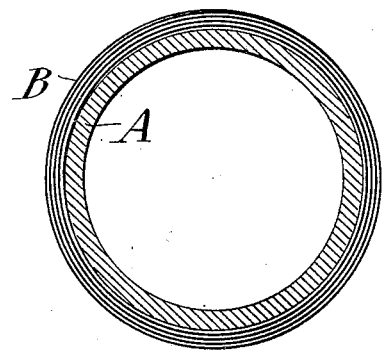
Figure 3:
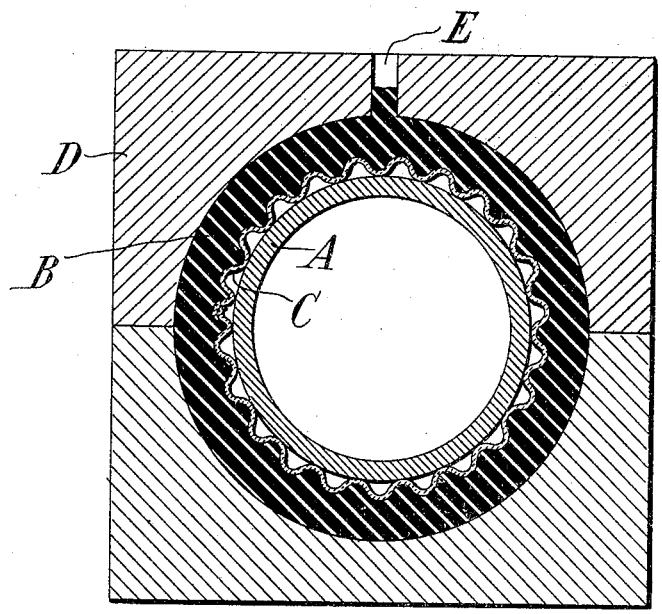

Figure 1 is a cross-section of one embodiment, and Fig. 2 a cross-section of another. Fig. 3 is a cross-section of another embodiment illustrating also a method of applying the paraffin coating.

A is assumed to be an iron pipe of a refrigerating or similar machine.

B is a coating of paraffin on the outside thereof, which may be applied by painting it on the pipe or by melting and pouring it into a mold surrounding the pipe or by wrapping around the pipe a paraffin-coated paper, cloth, or other fabric in the manner indicated in Fig. 2. The paraffin coating acts as a non-conductor and insulator. The moisture of the air will not adhere to it long enough to freeze. It is extremely cheap and is substantially permanent. When the paraffin coating wears away or becomes thin by melting or otherwise, it may be maintained in any suitable way—as, for example, by painting over additional paraffin from time to time.

The pipe A may be first wrapped in an insulating layer or coating of any suitable kind—such, for example, as the ring C, of corrugated paper or pasteboard, either plain or soaked in paraffin. Upon the outside of this insulating layer the paraffin B may be applied. A mold may be formed of two sections D, constituting practically a box surrounding the pipe with an opening E at the top, through which the melted paraffin is poured.

Though I have described with great particularity of detail certain embodiments of the invention, yet it is not to be understood that the invention is limited to the specific embodiments disclosed. Various modifications thereof may be made by those skilled in the art without departure from the invention.

What I claim is—

A metal pipe A for refrigerating or other machines having a surrounding insulating layer C of corrugated fibrous material and an outer coating B of paraffin.

In witness whereof I have hereunto signed my name in the presence of two subscribing witnesses.

WILLIAM J. HAMILTON.

Witnesses:
JOHN L. McBRIDE,
WM. B. GRIFFEN.